United States Patent
Nam et al.

(10) Patent No.: US 7,374,079 B2
(45) Date of Patent: May 20, 2008

(54) METHOD FOR PROVIDING BANKING SERVICES BY USE OF MOBILE COMMUNICATION SYSTEM

(75) Inventors: Deok-Young Nam, Seoul (KR); Hyung-Seok Kim, Gyunggi-do (KR); Jun-Hyung Kim, Kyeongki-do (KR); Hee-Jin Park, Seoul (KR)

(73) Assignee: LG Telecom, Ltd., Seoul (KR)

( * ) Notice: Subject to any disclaimer, the term of this patent is extended or adjusted under 35 U.S.C. 154(b) by 629 days.

(21) Appl. No.: 10/872,444

(22) Filed: Jun. 22, 2004

(65) Prior Publication Data

US 2004/0267664 A1 Dec. 30, 2004

(30) Foreign Application Priority Data

Jun. 24, 2003 (KR) ............... 10-2003-0041140
Jun. 24, 2003 (KR) ............... 10-2003-0041141
Jun. 24, 2003 (KR) ............... 10-2003-0041142
Jun. 24, 2003 (KR) ............... 10-2003-0041143
Jun. 24, 2003 (KR) ............... 10-2003-0041144

(51) Int. Cl.
*G06K 19/06* (2006.01)

(52) U.S. Cl. .................... 235/379; 235/492

(58) Field of Classification Search ........... 235/379, 235/492, 375, 380, 382, 382.5
See application file for complete search history.

(56) References Cited

U.S. PATENT DOCUMENTS

| | | | |
|---|---|---|---|
| 6,581,845 B2 * | 6/2003 | Ye | 235/492 |
| 6,736,322 B2 * | 5/2004 | Gobburu et al. | 235/462.46 |
| 2002/0060246 A1 * | 5/2002 | Gobburu et al. | 235/462.46 |
| 2002/0109580 A1 * | 8/2002 | Shreve et al. | 340/5.61 |
| 2003/0010831 A1 * | 1/2003 | Ye | 235/492 |
| 2004/0019564 A1 * | 1/2004 | Goldthwaite et al. | 705/44 |
| 2004/0098350 A1 * | 5/2004 | Labrou et al. | 705/64 |

* cited by examiner

*Primary Examiner*—Thien Minh Le
(74) *Attorney, Agent, or Firm*—Greenblum & Bernstein, P.L.C.

(57) ABSTRACT

A method of providing banking services by use of a mobile communication system having a removable built-in integrated circuit (IC) card chip in which personal identification number (PIN) information and related information on financial accounts of a user are stored. The method includes selecting an electronic bankbook service and selecting any one from financial transactions for the electronic bankbook service and comparing the PIN information input at the mobile communication system with the PIN information stored in the IC card chip, and authenticating access to data stored in the IC card chip on the mobile communication system. The method further includes displaying financial account information of the user stored in the IC card chip in a display window of the mobile communication system and forming a financial transaction request message using the related information of the selected financial account through a banking application built in the mobile communication system, and transmitting the financial transaction request message to the banking server. The method further includes performing a predetermined customer authentication process with respect to the financial transactions and financial accounts at the banking server, and transmitting a financial transaction response message to the mobile communication system and displaying the resulting transaction history in the display window of the mobile communication system.

16 Claims, 7 Drawing Sheets

METHOD FOR PROVIDING BANKING SERVICES BY USE OF MOBILE COMMUNICATION SYSTEM

BACKGROUND OF THE INVENTION

1. Field of the Invention

The present invention relates to a method for providing banking services by use of a mobile communication system, more particularly, in which the mobile communication system is provided with a removable integrated circuit (IC) card chip in which personal identification number (PIN) information, financial account information, etc. are stored, and a banking application for financial transactions which is driven on a Java Virtual Machine and mobile banking such as mobile account inquiry, transfer/remittance, loan/payment and so forth are used, thereby maximizing convenience of a user with regard to the mobile banking, and simultaneously minimizing network loads of a communication network and reinforcing security against data and financial information.

2. Description of the Related Art

Currently, as mobile communication systems become enhanced in their performance together with communication networks, there are provided a variety of mobile banking services by use of the mobile communication systems such as mobile phones, personal digital assistants (PDAs), and etc. In particular, such mobile banking services make it possible for any customer to conveniently use banking services, such as account inquiry; transfer, remittance and payment; and inquiry and payment of a loan, anytime and anywhere without visiting their correspondent banks in person.

Generally, conventional mobile banking services including an account inquiry, transfer or remittance of funds have employed a wireless Internet system on the basis of WAP (wireless application protocol). Specifically, the conventional mobile banking services allow any Internet banking user to drive a WAP browser of a terminal (e.g. personal computer), to have access to the URL (uniform resource locator) of a banking server of interest, to input his/her own ID (identification) and password for authentication, and after authentication, to deal with banking services such as account inquiry, transfer/remittance, and inquiry of a loan account overview and payment of its interest and etc.

These conventional mobile banking services merely change Internet banking services over a wired Internet into that over the wireless Internet based on the WAP. Because mobile communication systems still fail to provide large sized screens, easy input procedure and storage capability like personal computers, there is much inconvenience in actual use.

Further, whenever using his/her desired banking service, the customer must input various kinds of information, such as ID, password, account number and so forth, through the mobile communication system. Thus, the customer encounters difficulty in using the banking service. Further, because of the vulnerability of security of the mobile communication system, it is next to impossible to store and use data related to personal information in the memory of the mobile communication system.

In addition, once the mobile communication system has access to a banking server, a series of processes, for example, inputting the account number, performing customer authentication, inquiring of financial transaction history, inquiring of an overview of a loan account, paying interest on a loan and etc. are performed during the session. Hence, there are problems in that the user or customer is weighted with the charges for a phone call, etc., and the communication network is heavily loaded.

SUMMARY OF THE INVENTION

To solve the above-indicated problems, it is, therefore, an aspect of the present invention to provide a method for providing banking services by use of a mobile communication system, capable of, when using mobile banking such as a mobile account inquiry service, a mobile transfer/remittance service, a mobile loan overview inquiry and loan interest payment service and so forth, minimizing both the access time between a mobile communication system and a banking server and network loads of a communication network by simplifying the complicated inputting procedure of a user and improving the network access process, while reinforcing security against data transmission and financial information.

To achieve this aspect, according the present invention, there is provide a method for providing banking services by use of a mobile communication system, in which financial transactions are performed with a banking server of at least one financial institution using the mobile communication system having a removable built-in integrated circuit (IC) card chip in which personal identification number (PIN) information and related information on financial accounts of a user are stored, the method comprising: a financial transaction selection step of selecting an electronic bankbook service through any one of a mobile banking (M/B) dedicated key and a menu option provided to the mobile communication system, and selecting any one from financial transactions for the electronic bankbook service; a PIN authentication step of comparing the PIN information input at the mobile communication system with the PIN information stored in the IC card chip, and authenticating access to data stored in the IC card chip on the mobile communication system; a financial information display step of, when a login is completed to the IC card chip through the PIN authentication step, displaying financial account information of the user stored in the IC card chip in a display window of the mobile communication system; a financial information transmission step of, when a signal based on selection of the financial account is input at the mobile communication system, forming a financial transaction request message using the related information of the selected financial account through a banking application built in the mobile communication system, and transmitting the financial transaction request message to the banking server; a financial information response step of performing a predetermined customer authentication process with respect to the financial transactions and financial accounts at the banking server, and transmitting a financial transaction response message to the mobile communication system; and a transaction history display step of receiving the financial transaction response message transmitted from the banking server, and displaying the resulting transaction history in the display window of the mobile communication system.

Further, the method further comprises: an update step of updating information on at least one of a new account which is newly opened at a bank institution, and an old account which is corrected/closed with respect to the IC card chip of the mobile communication system using a wireless communication network; and a correction/modification step of freely correcting/modifying the PIN information of the IC card chip which is removably built in the mobile communication system with the user, wherein the mobile communication system and the banking server make use of any one of encryption solutions including E2E (end to end) and WPKI (wireless public key infrastructure) for security of data and financial information under a mobile environment.

Meanwhile, the mobile communication system is communication equipment such as a mobile phone, a smart phone and a personal digital assistant (PDA) and so on, and the financial information transmission step comprises a step of forming the financial transaction request message using account numbers of each financial account of the user, financial institution codes corresponding to the financial accounts, kinds of the financial accounts and customer information.

Further, the method further comprises a step of, when the financial transaction selected through the mobile communication system is a financial account inquiry transaction, checking the related information of the selected financial account through the banking application at the IC card chip, transmitting an account inquiry request message to the corresponding banking server, and displaying a response message of the transaction history transmitted from the banking server.

In addition, the method further comprises, when the financial transaction selected through the mobile communication system is a transfer/remittance transaction, a withdrawal account input step of inputting an account number and transfer amount of a withdrawal account among from the financial accounts, an account number of a deposit account of the financial accounts, and information of the corresponding financial institution; a reserved transaction request step of requesting a reserved transfer transaction from the corresponding banking server based on information of the deposit/withdrawal accounts and the transfer amounts; a security card number input step of generating a security card number of consisting of random numbers from the banking server in response to the reserved transfer transaction, transmitting the generated security card number to the mobile communication system, inputting the security card number into the mobile communication system again, and transmitting the input security card number to the banking server; and a processed result display step of transmitting the security card number to the banking server to request a main transfer transaction with respect to the corresponding deposit/withdrawal accounts, and receiving a result of processing the main transfer transaction from the banking server to display the processed result in the display window of the mobile communication system.

Furthermore, the method further comprises an account registration step of registering the target account after the financial transaction as a favorite account, and the withdrawal account input step includes any one of a step of directly inputting the account number of the deposit account and the corresponding financial institution information through the mobile communication system and a step of selectively inputting the deposit account by a search of a "favorite deposit account" through the banking application.

Also, the method further comprises, when the financial transaction selected through the mobile communication system is a loan inquiry/loan interest payment transaction, a loan account check step of extracting a list of loan accounts stored in the IC card chip, displaying the list of loan accounts in the display window of the mobile communication system, and checking related information of the corresponding loan account selected from the list of loan accounts; a loan account inquiry step of having access to the corresponding banking server based on the related information of the corresponding loan to request information on a transaction history of the corresponding loan account, receiving a response message to the request, and outputting the response message to the display window of the mobile communication system; a password input step of extracting and displaying a list of general financial accounts stored in the IC card chip, selecting a withdrawal account for money withdrawal from the list of general financial accounts, and inputting a password of the withdrawal account; a reserved transaction request step of transmitting the related information of the selected loan and withdrawal accounts to the corresponding banking server, requesting a reserved payment transaction, receiving a response message from the corresponding banking server, and outputting the response message; and a main transaction processing step of processing a main transaction following the reserved payment transaction in cooperation with the corresponding banking server in response to the request of the main transaction by the user after the reserved payment transaction is normally done.

Preferably, the loan account inquiry step includes a step of requesting loan interest information of the loan account from the banking server according to the request of the user, receiving the response message, and outputting the response message to the display window of the mobile communication system.

BRIEF DESCRIPTION OF THE DRAWINGS

The above aspects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described below in detail with reference to the accompanying drawings.

Figure 1:
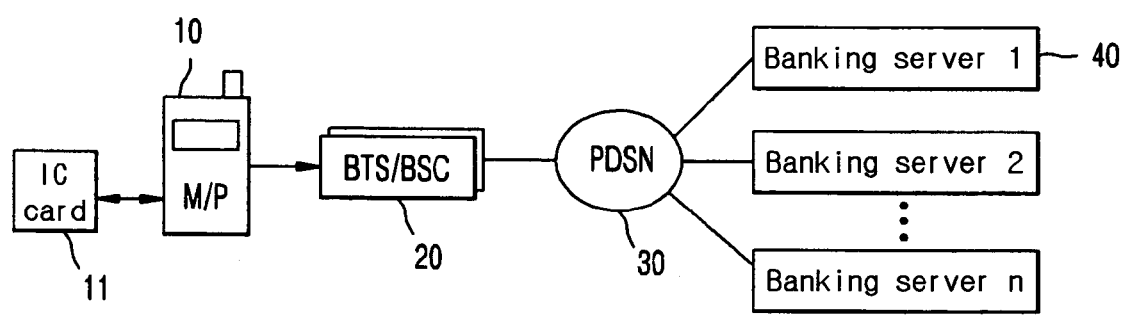
FIG. 1 illustrates a schematic configuration of a system needed to implement a method for providing banking services by use of a mobile communication system according to the present invention.

FIG. 1 illustrates a schematic configuration of a system needed to implement a method for providing banking services by use of a mobile communication system according to the present invention.

Referring to FIG. 1, a system needed to implement a method for providing banking services according to the present invention is generally composed of a mobile communication system 10 of a user or customer, a base station transceiver system/base station controller (BTS/BSC) 20 for supporting wireless communication of the mobile communication system 10, a packet data switching network (PDSN) 30, and banking servers 40 installed at each financial institution in the mobile banking network.

The PDSN 30 provides a packet data transfer service using a PPP (point-to-point protocol) and a TCP/IP (transmission control protocol/Internet protocol) between a RAN (Radio Access Network) and a DCN (Data Core Network), wherein the RAN constitutes of the BTS/BSC 20 and so on. The banking services of the present invention are provided on the basis of the TCP/IP.

Each banking server 40 is the equipment provided for each financial institution so as to interact with the mobile system. Each banking server 40 receives a variety of request messages such as one for an account inquiry, one related to transfer/remittance, one related to loan overview inquiry/loan interest payment, etc., performs a customer authentication process, deals with the received messages in interaction with its host server, and transmits the results and their related data to the mobile communication system 10 through the PDSN 30.

The mobile communication system 10 and the banking server 40 have access to each other by using the TCP/IP. Various kinds of data or information are transmitted and received between the mobile communication system 10 and each banking server 40 by wireless TCP/IP communication using a wireless data network.

Meanwhile, the mobile communication system 10 includes a mobile or cellular phone, a smart phone, a personal digital assistant (PDA) and etc., each of which is provided with all the hardware for the wireless data communication. The mobile communication system 10 is equipped with a removable IC card chip 11 and a memory device mounting all software (S/W) for mobile banking services such as account inquiry, transfer/remittance of funds, loan overview inquiry and loan interest payment, and etc.

The IC card chip 11 can be removed from the mobile communication system 10 and has various kinds of stored information, such as personal identification number (PIN) information, financial account information of the user or other persons, and customer information. The user can have access to the stored information by PIN authentication, wherein the PIN authentication is performed by inputting information on a password of the IC card chip 11, namely the PIN information, and by checking whether the input PIN information is matched with stored PIN information or not. Further, various kinds of information related to each financial account and each loan account, for example, the account number and password, the code of the corresponding financial institution, the kind of account (e.g., an ordinary deposit account, a savings account, an installment savings deposit account, a loan account for housing, etc.), are matched and stored in the IC card chip 11.

The stored information of the IC card chip 11 is set when the IC card chip 11 is issued at a financial institution window such as a bank window. The user can complete a login to the IC card chip 11 through the PIN authentication which is allowed to check whether the PIN information stored in the IC card chip 11 is matched with that input through the mobile communication system 10 or not, and then is capable of modifying and adding the financial account information (the account number, the password, etc.) through the mobile communication system 10.

In addition, when the user applies for the IC card chip 11 through a postal service without visiting the financial institution in person, the financial institution sends the IC card chip 11 to the user in a state incapable of setting the PIN information. Only after the user informs the financial institution that he/her has received the IC card chip 11, the financial institution provides a short message service (SMS) to the user's mobile communication system 10 to which the IC card chip 11 is mounted, and then the user can manage the IC card chip 11 in a state capable of setting the PIN information. Thereby, it is possible to previously prevent misuse of the IC card 11, which is responsible for loss or theft of the IC card chip 11 while being sent. Thus, the user can be supported to have the IC card chip issued without directly visiting the financial institution. In other words, a short message of the SMS includes a control message for setting the PIN information, and is forwarded to the mobile communication system 10. The control message, which is forwarded to the mobile communication system 10, invokes the IC card API (application programming interface) that is built in the mobile communication system 10 (see FIG. 2). Then, Java virtual machine (Java VM) transmits data of the IC card API to the IC card driver through the system S/W together with the control message. Next, the control message is manipulated at the IC card chip 11, thus making it possible to set the PIN information.

Further, in the IC card chip 11, some of the financial accounts of the user (himself/herself) or any other person can be registered and managed by selection of the user as "favorite deposit accounts" together with information on depositor(s) of the some accounts in order to facilitate the transfer/remittance of funds.

The IC card chip 11 not only has access to its stored information only through the PIN authentication, but it can be also attached and used in the mobile communication system 10 if necessary, and can be separately kept if not used. Thus, it is possible not only to provide convenience to users when they input information related to their financial accounts, but also to ensure security of the input information.

Moreover, the mobile communication system 10 and the banking server 40 disclosed in the present invention may fundamentally make use of an encryption solution such as E2E (end to end), WPKI (wireless public key infrastructure) etc. for security of data and financial information under the mobile environment.

Figure 2:
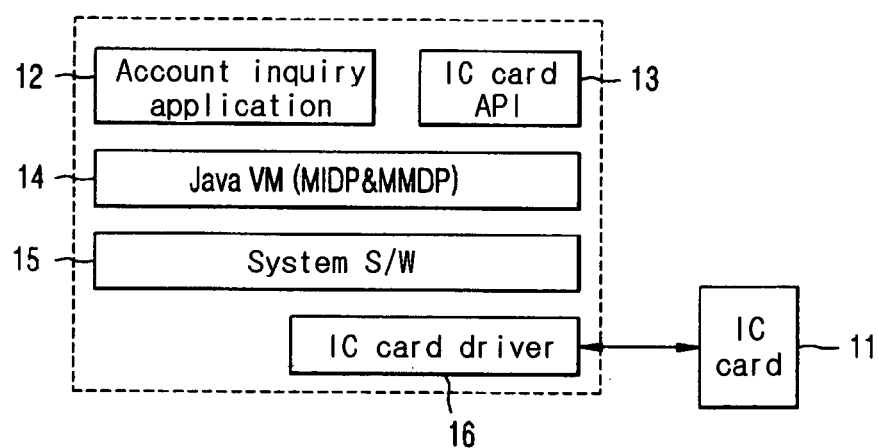
FIG. 2 illustrates a hierarchical structure or a configuration of software (S/W) of a mobile communication system according to the present invention.

FIG. 2 illustrates a hierarchical structure, or a configuration, of software (S/W) for the mobile communication system 10.

Referring to FIG. 2, a configuration of software (S/W) for the mobile communication system 10 has an IC card driver 16 and system S/W 15, which are established as a lower structure, a Java virtual machine (Java VM) 14, and a banking application 12 and an IC card API 13, which are established as an upper structure, wherein the IC card driver 16 is for managing data of the IC card chip 11, and the system S/W 15 is for managing basic functions of the mobile communication system 10.

The banking application 12 is a process S/W program for executing mobile financial transactions such as account inquiry, transfer/remittance of funds, loan/payment, and so forth.

The Java VM 14 is an intermediate code defined so as to allow the (mobile) banking application 12 to be executed by a virtual machine regardless of an operation system (O/S) or a platform.

The banking application 12, as an S/W program having a series of processes for the mobile account inquiry, receives data and selection instructions through the mobile communication system 10 or outputs a result of the account inquiry etc., and transmits/receives data to/from the IC card chip 11 and the banking server 40.

The banking application 12 and the IC card API 13 can perform upgrading independently of the lower structure by use of the functions of the Java VM 14, and can perform both downloading and upgrading of S/W through a wireless network.

Meanwhile, a brief description will be made below regarding a process of having access to the IC card chip at the banking application 12.

In the present invention, in order to read out the PIN information and financial account information stored in the IC card chip 11, the IC card API 13 is invoked at the banking application 12, and the Java VM 14 transmits the read instructions of the corresponding information to the IC card driver 16 though the system S/W 15 on the basis of the data of the IC card API 13. Thereby, the IC card driver 16 drives the IC card chip 11 to read out the corresponding information.

And, the banking application 12 processes the information which is read out from the IC card chip 11, displays it in a display window of the mobile communication system 10, and requests the banking server 40 to transmit information caused by the mobile banking services such as the mobile account inquiry, the mobile transfer/remittance of funds, and the mobile loan account inquiry and loan interest payment.

Hereinafter, each embodiment of the present invention will be described with reference to the drawings, wherein each embodiment relates to the mobile banking services such as the account inquiry, the transfer/remittance, the loan account inquiry and payment of the loan interest and so forth.

In each embodiment that will be set forth below, the banking application 12 has different terms according to each banking service. For example, the banking application 12 may be classified into an account inquiry application, a transfer/remittance application and a loan/payment application, which are all given the same reference number.

First Embodiment

Figure 3:
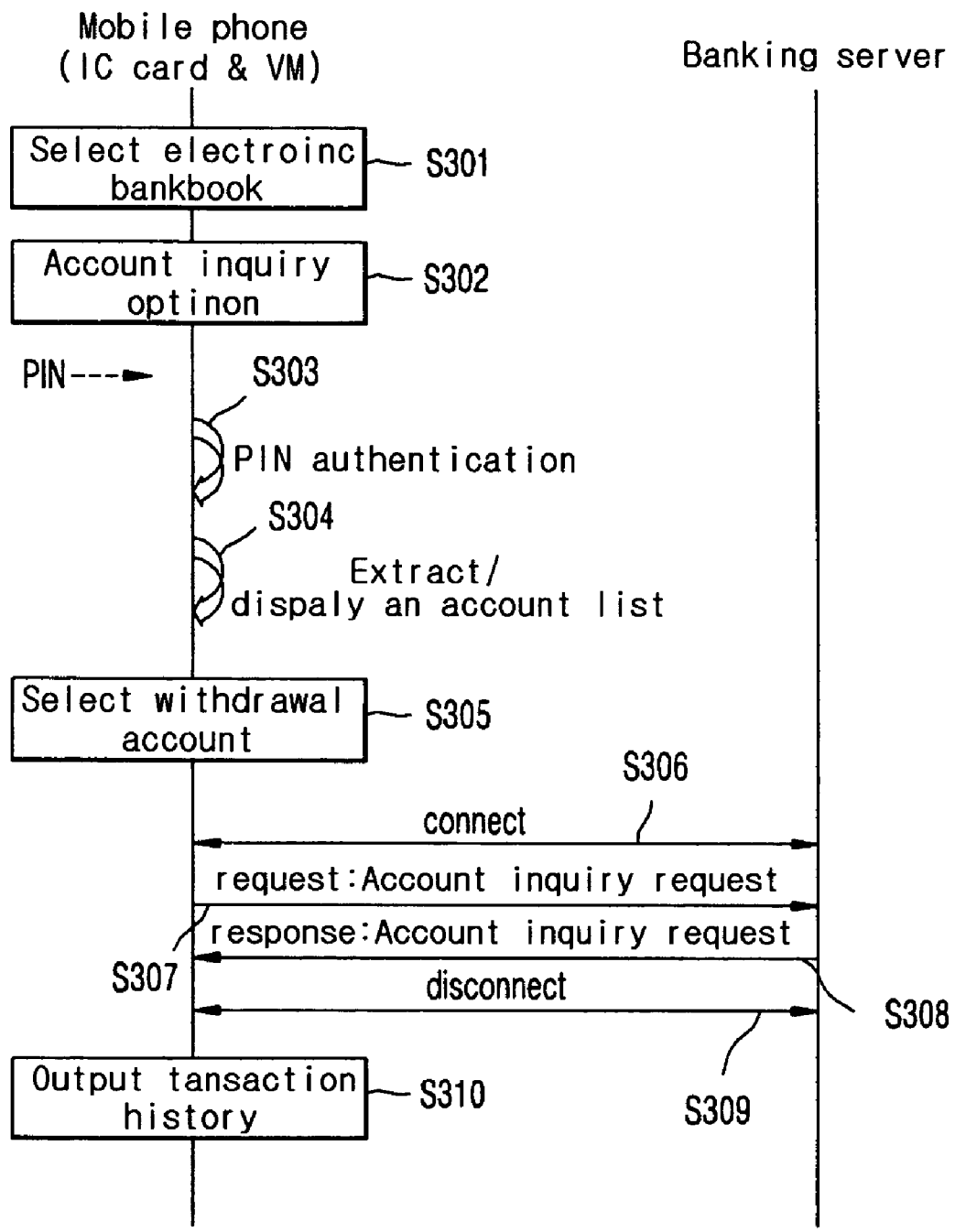
FIG. 3 is a flow diagram showing a financial account inquiry service according to a first embodiment of the present invention.

FIG. 3 is a flow diagram showing a mobile account inquiry service according to a first embodiment of the present invention, in which a process of providing the mobile account inquiry service by interaction between the IC card chip 11 and the mobile communication system 10 and the banking server 40 is illustrated.

Figure 4:
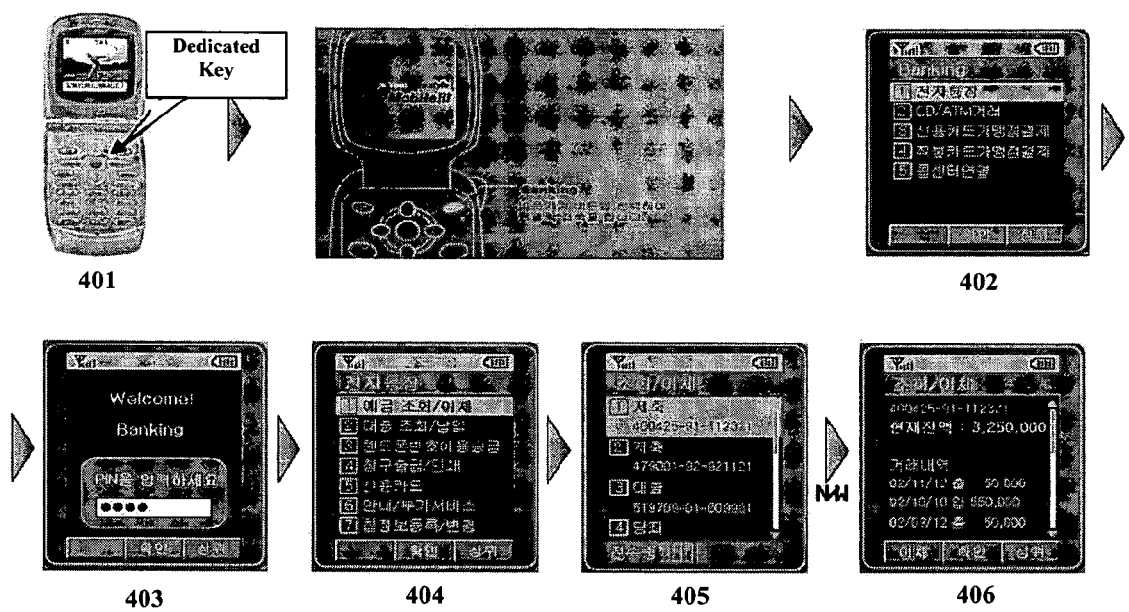
FIG. 4 illustrates user interface screens according to a financial account inquiry service of the present invention.

Referring to FIG. 3, in order to use the mobile account inquiry service according to the first embodiment, an electronic bankbook service is selected through an M/B (mobile banking) dedicated key or a menu option that is installed on the mobile communication system 10 as illustrated in FIG. 4 (S301). Among the options of the electronic bankbook service, any one, namely an account inquiry service is selected (S302).

When the account inquiry service is selected from the options of the electronic bankbook service, the banking application or account inquiry application 12 activates an input screen of the PIN information in the display window of the mobile communication system 10 in response to an input signal of the key. Then, when the PIN information is input by a user, the account inquiry application 12 has access to the IC card chip 11, reads out the PIN information which has been stored in the IC card chip 11, and performs PIN authentication by comparison of the input PIN information with the read-out PIN information (S303).

When the password of the IC card chip 11, i.e. the PIN information, input through the mobile communication system 10 is matched with the PIN information stored in the IC card chip and then a login is completed to the IC card chip 11, the account inquiry application 12 outputs financial accounts of the user stored in the IC card chip 11 to the display window of the mobile communication system 10. Thereby, the user checks the kinds of financial accounts and has a list of all general financial accounts outputted to the display window, excluding loan accounts (S304).

Then, the user selects one financial account intended for inquiry from the financial account list displayed in the display window of the mobile communication system 10 and requests the account inquiry (S305). In response to this request, the account inquiry application 12 verifies information on the financial account selected by the user (i.e., account number and password, financial institution code, customer information, etc.) by the IC card chip 11, and constructs an account inquiry request message including the verified information.

The mobile communication system 10 has socket access to the banking server 40 through the BTS/BSC 20 and the PDSN 30 to establish a data transmission line (S306), and forwards the constructed account inquiry request message to request information on a recent transaction history of the financial account (S307). At this point, the mobile communication system 10 may do so after receiving start and end dates for the account inquiry from the user.

Thus, the banking server 40 carries out the authentication procedure through the account number and password, customer information, etc. which are transmitted from the mobile communication system 10. When the authentication of the financial account is completed, the banking server 40 extracts the transaction history information within a recent or designated inquiry time period from a host server, constructs a transaction history response message including the extracted transaction history information, and transmits the constructed transaction history response message to the corresponding mobile communication system 10 (S308).

When the mobile communication system 10 normally receives the transaction history information on the financial account inquiry through the above-mentioned processes, the data transmission line between the mobile communication system 10 and the banking server 40 is released (S309), and the account inquiry application 12 displays information on date-specific transaction history, balance, etc., of the financial account in the display window of the mobile communication system 10 (S310).

Although not shown in the drawing, according to circumstances, the user can update information on a new account which is newly opened at a certain bank institution and/or an old account which is corrected/closed. The updated information is stored in the IC card chip of the mobile communication system using the wireless communication network. The user can freely correct/modify the PIN information of the IC card chip which is provided for the mobile communication system.

As set forth above, in the present invention, the account number and password, the customer information, etc., are processed by option selection and automatic input without separately inputting them, so that it is possible to afford convenience to the user. Further, the mobile communication system carries out a series of processes such as selection of the financial account in advance, has access to the banking server, and proceeds the account inquiry process, so that it is possible to reduce the time for getting access to the banking server and network loads of the communication network.

FIG. 4 sequentially illustrates interface screens, each of which is displayed in the display window of the mobile communication system 10 of the user by driving of the account inquiry application 12, according to the first embodiment.

Referring to FIG. 4, in order to carry out the banking services, the user presses the M/B dedicated key 401 installed on the mobile communication system 10 to activate the electronic bankbook service, and then selects the account inquiry service 402 (inquiry/transfer of funds on deposit) among the options of the electronic bankbook service.

The display window of the mobile communication system 10 allows the input screen of the PIN information 403 for initiating the account inquiry service to be displayed. Then, the authentication procedure of the PIN information input through the mobile communication system 10 is performed. After the authentication is completed, the list of the financial accounts of the user stored in the IC card chip 11 is accessed, extracted and displayed 404.

When the user selects any financial account intended for inquiry from the list of the financial accounts displayed in the display window of the mobile communication system 10 and requests an inquiry, the mobile communication system 10 constructs the inquiry request message 405 using the information related to the selected financial account, and transmits the constructed inquiry request message to the banking server 40. The mobile communication system 10 receives data derived from the inquiry, and displays the transaction history by date 406.

Second Embodiment

Figure 5:
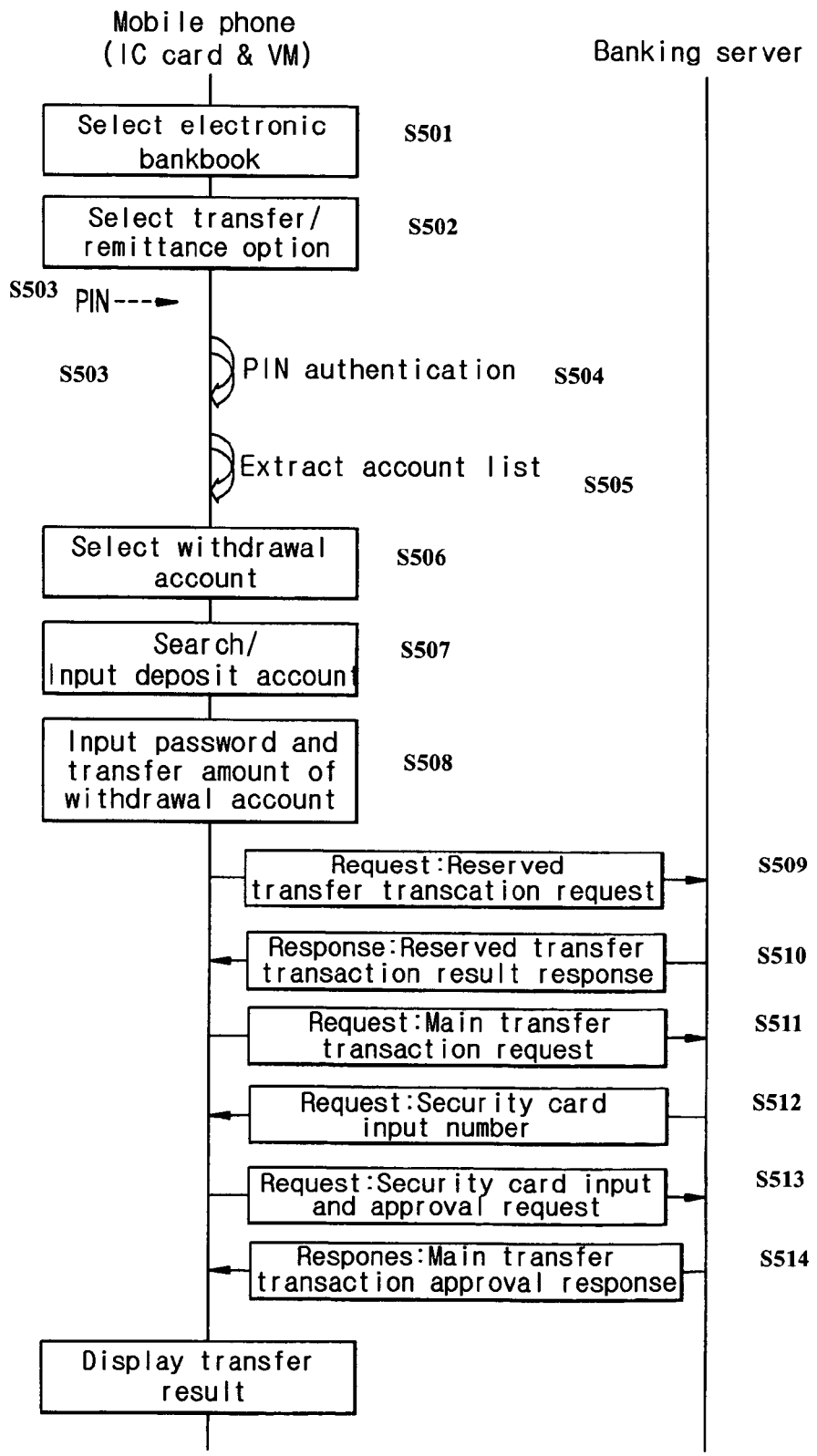
FIG. 5 is a flow diagram showing a mobile transfer/remittance process according to a second embodiment of the present invention.

FIG. 5 is a flow diagram showing a mobile transfer/remittance service according to a second embodiment of the present invention, in which a process of dealing with the mobile transfer/remittance service by interaction between the IC card chip 11 and the mobile communication system 10 and the banking server 40 is illustrated.

Figure 6:
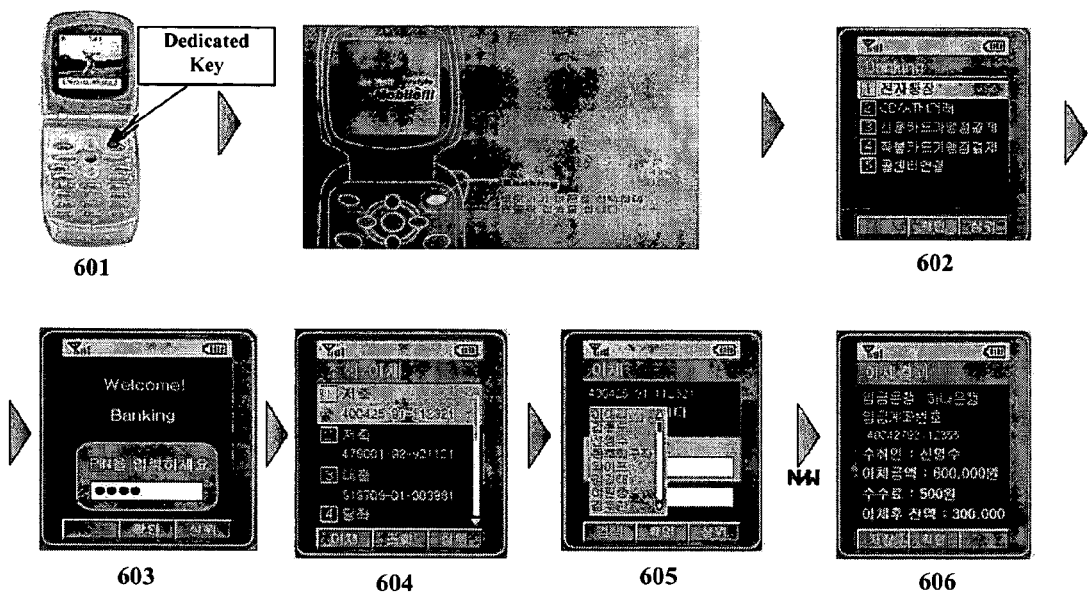
FIG. 6 illustrates user interface screens according to a mobile transfer/remittance service of the present invention.

Referring to FIG. 5, in order to get the mobile transfer/remittance service, an electronic bankbook service is selected S501 through an M/B (mobile banking) dedicated key or a menu option, which is provided to the mobile communication system 10 as illustrated in FIG. 6. Among the options of the electronic bankbook service, any one, namely a transfer/remittance service is selected S502.

Thereby, the transfer/remittance application (or mobile banking application) 12 outputs an input screen with the PIN information in a display window of the mobile communication system 10. Then, when the PIN information is input by a user, the transfer/remittance application 12 has access to the IC card chip 11 connected to the mobile communication system 10, reads out the PIN information which has been stored in the IC card chip 11, compares the input PIN information with the read-out PIN information, and authenticates access to the stored data of the IC card chip 11.

When the input and read-out PIN information are matched with each other and a login is completed to the IC card chip 11, the transfer/remittance application 12 displays financial accounts of the user stored in the IC card chip 11 in the display window of the mobile communication system 10. When a key signal related to the transfer/remittance of funds is input by the selection of the user, a list of the general financial accounts excluding loan accounts is outputted. Then, the user selects a withdrawal account from the displayed financial account list S503, so that the user can get services related to the transfer/remittance of funds.

Then, the transfer/remittance application 12 displays the input screen for a deposit account in the display window of the mobile communication system 10, thereby allowing information on the account number of the deposit account as well as information on a financial institution to be input by the user S504. Here, the user may select and input the deposit account information through a search without directly inputting the information of the deposit account. In other words, when the user selects a search option for the deposit account, the transfer/remittance application 12 has access to the IC card chip 11 to output both a list of the financial accounts categorized as "favorite deposit accounts" and information on their depositors, and also the user may select any one of the financial accounts as the deposit account.

Further, the transfer/remittance application 12 receives information on the password of the withdrawal account selected by the user and information on the amount of transfer S505.

When this input and selection process is completed, and then the user requests the transfer/remittance of funds, the transfer/remittance application 12 has socket access to the banking server 40 of the financial institution which keeps the withdrawal account, and establishes a data transmission line S506.

The transfer/remittance application 12 drafts a reserved transfer transaction request message with information related to the withdrawal and deposit accounts and the amount of transfer/remittance, and requests a reserved transfer transaction from the banking server 40 of the financial institution which keeps the withdrawal account through the data transmission line.

When a response message based on the reserved transfer transaction is normally received from the banking server 40, and thus the user presses the confirmation key, the banking server 40 generates random numbers ranging from 1 to 35 as the number for a security card S507. The user checks the security card to input a password of the security card, which corresponds to the security card number.

Thereby, the transfer/remittance application 12 constructs a main transfer transaction request message S508 using the transaction history and information of the security card, and requests the main transfer transaction from the banking server 40.

When the banking server 40 performs authentication based on the security card S509 & S510, processes the corresponding main transfer transaction, and normally transmits a main transfer transaction response message S511, the data transmission line between the mobile communication system 10 and the banking server 40 is released, and the transfer/remittance application 12 displays the result of processing the main transfer transaction in the display window of the mobile communication system 10.

In this manner, when the main transfer transaction ends in success, the user can register the deposit account for the transfer of funds in the list of "favorite deposit accounts." Then, this registered information is stored in the IC card chip 11.

As set forth above, the information related to the deposit/withdrawal accounts is processed by option selection and automatic input without separately inputting it, so that it gives convenience to the user. Further, after carrying out a series of processes such as inputting the deposit/withdrawal accounts for the transfer of funds, inputting the amount of transfer, etc., the mobile communication system 10 has access to the banking server 40. Therefore, it is possible to reduce the time for getting access to the banking server 40 and network loads of the communication network.

FIG. 6 sequentially illustrates interface screens, each of which is displayed to the user by the transfer/remittance application 12, according to the second embodiment.

Referring to FIG. 6, the user presses the M/B dedicated key installed on the mobile communication system 10 to activate the electronic bankbook service 601, and then selects the transfer/remittance service (inquiry/transfer of funds on deposit) from the options of the electronic bankbook service 602.

Thus, the display window of the mobile communication system 10 allows the input screen of the PIN information to be displayed 603. When the PIN authentication is completed with respect to the IC card chip 11, the list of the deposit accounts of the user stored in the IC card chip 11 is extracted and the list of the deposit accounts is displayed in the display window of the mobile communication system 10.

Further, the display window of the mobile communication system 10 is allowed to select the deposit account by outputting either the input screen for the deposit accounts or the list of their depositors through a menu for the account search 604, and to output the input screen (not shown) for the account password and the transfer amount which the user is able to input 605.

In this manner, when the deposit/withdrawal accounts are selected and the transfer amount is input, the network connection and data transmission are performed between the mobile communication system 10 and the banking server 40. Then, the mobile communication system 10 receives the result of processing the transfer/remittance of funds from the banking server 40, and outputs the received result to its display window 606.

Third Embodiment

Figure 7:
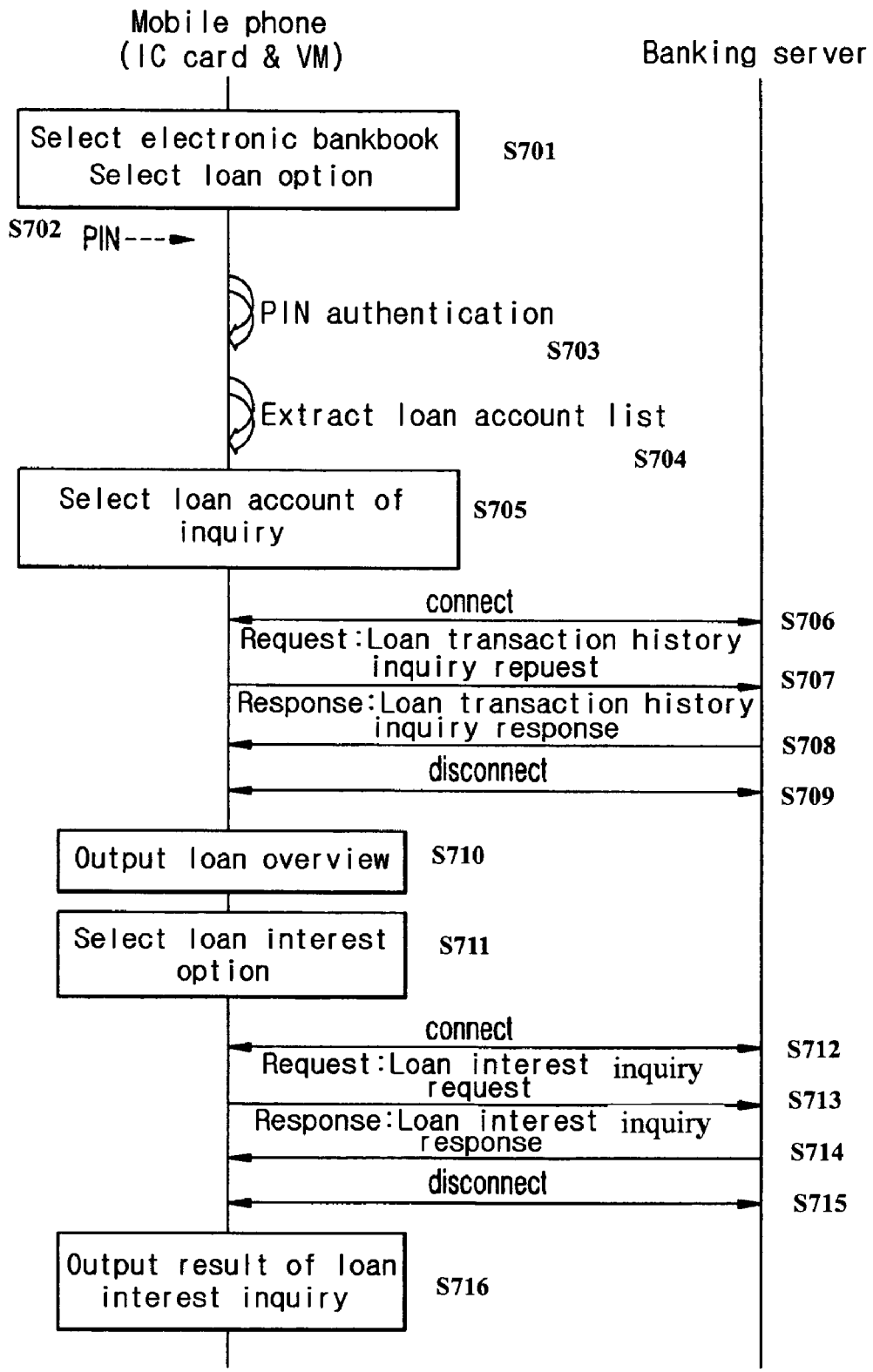
FIG. 7 is a flow diagram showing a mobile loan overview and loan interest inquiry process according to a third embodiment of the present invention.

FIG. 7 is a flow diagram showing a mobile loan overview and loan interest inquiry process according to a third embodiment of the present invention.

FIG. 7 illustrates a process of inquiring of the overview of a loan account of a user and the interest on the loan by interaction between the IC card chip 11 and the mobile communication system 10 and the banking server 40.

Referring to FIG. 7, an electronic bankbook service is selected through an M/B (mobile banking) dedicated key or a menu option S701, which is provided to the mobile communication system 10. Among the options of the electronic bankbook service, any one, namely a loan inquiry/payment service is selected.

Thereby, the loan/payment application (or banking application) 12 outputs an input screen of PIN information to a display window of the mobile communication system 10, has access to the IC card chip 11, reads out the PIN information which has been stored in the IC card chip 11, compares the PIN information input by the user with the stored PIN information, and executes PIN authentication in order to have access to data of the IC card chip 11.

When the input and stored PIN information are matched with each other and a login is completed to the IC card chip 11, the loan/payment application 12 displays a list of loan accounts of the user stored in the IC card chip 11 in the display window of the mobile communication system 10.

The user requests the inquiry by selecting S702 the corresponding account intended for inquiry from the list of the loan accounts displayed in the display window of the mobile communication system 10, the loan/payment application 12 has socket access to the banking server 40 of the financial institution which keeps the selected loan account and establishes a data transmission line.

Then, the loan/payment application 12 drafts a transaction history inquiry request message with an account number, a password, etc. of the loan account, and requests a loan transaction history inquiry from the banking server 40 through the data transmission line.

In response to the request, the banking server 40 performs a predetermined customer authentication process, checks recent transaction history data of the corresponding loan account in interaction with its host server, constructs a loan transaction history response message, and transmits the constructed loan transaction history response message to the mobile communication system 10.

In this manner, when the loan transaction history of the corresponding loan account is normally received, the data transmission line between the mobile communication system 10 and the banking server 40 is released, and the loan/payment application 12 displays a result of the inquiry in the display window of the mobile communication system 10.

At this time, outputs of the inquiry result include an account number of the corresponding loan account, an amount of the loan, a payment history of the loan, which are displayed along with processed month/date/year, an amount of loan repayment, an amount of loan interest, and so forth S703. After inquiring of this loan overview, the user selects and clicks an option for a loan interest inquiry S704. Then, the mobile communication system 10 has data access to the banking server 40 again, constructs a loan interest inquiry request message by means of account number, password, inquiry term, etc. of the loan account, and transmits the constructed loan interest inquiry request message to the banking server 40.

The banking server 40 checks data related to the loan interest of the corresponding loan account, drafts a loan interest inquiry response message, and transmits the drafted loan interest inquiry response message to the mobile communication system 10.

In this manner, when the loan interest inquiry response message is normally received, the data transmission line between the mobile communication system 10 and the banking server 40 is released, and the loan/payment application 12 checks the received message, and displays information on the loan interest of the corresponding loan account in the display window of the mobile communication system 10. Here, outputs of the inquiry result may include the account number, the amount of a loan balance, the amount of loan repayment, the start and end dates in counting the loan interest, the loan interest, the overdue interest and so forth.

Figure 8:
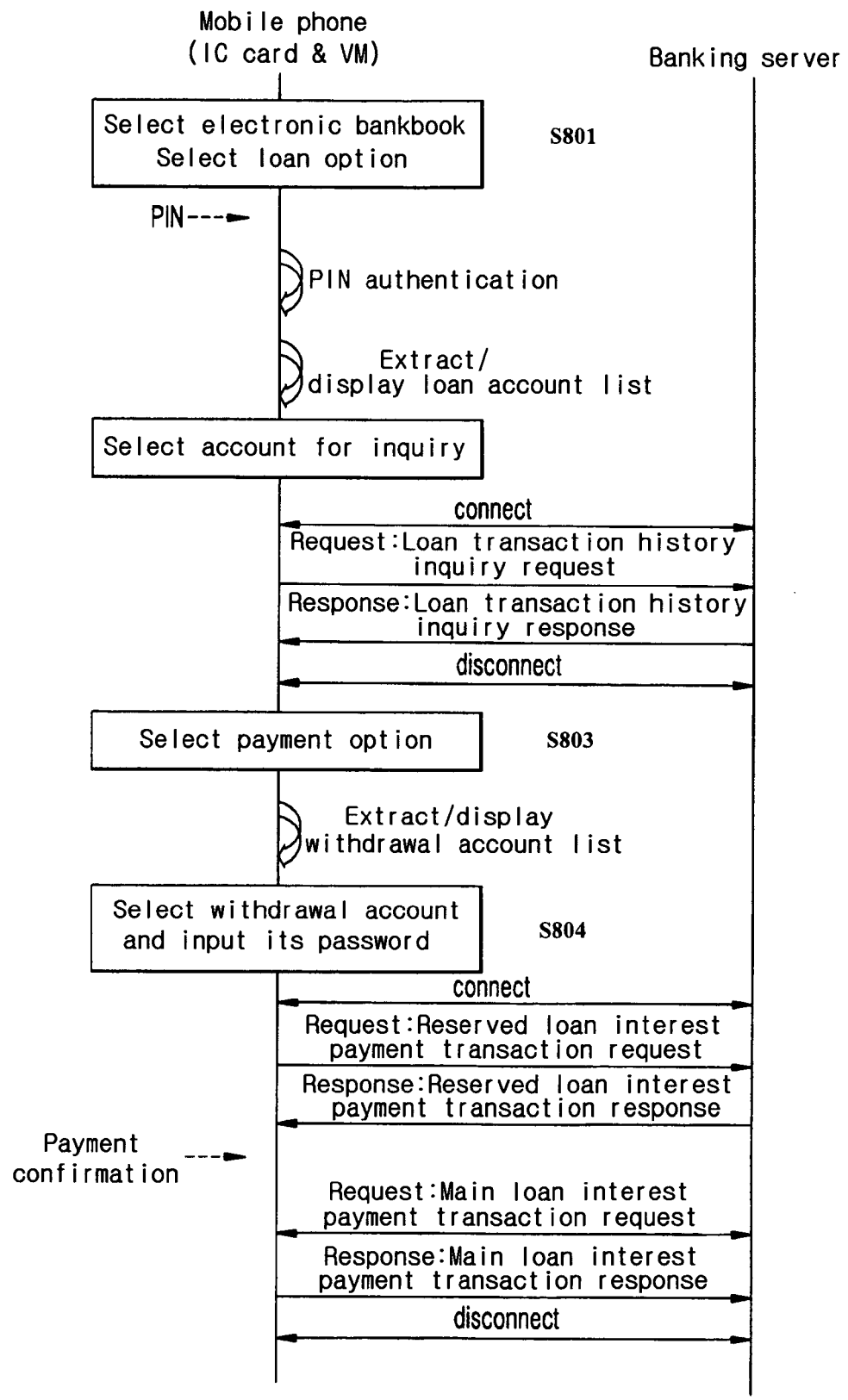
FIG. 8 is a flow diagram showing a loan interest payment process after a mobile loan overview inquiry according to the present invention.

FIG. 8 is a flow diagram illustrating a process of inquiring of an overview of a loan account of a user at both the mobile communication system 10 and the banking server 40, and a process for paying the loan interest.

FIG. 8 shows a process of selecting electronic bankbook and loan/payment options to inquire of and output an overview of a specified loan account S801 & S802, which is similar to that set forth in FIG. 7.

In this manner, after the specified loan account is inquired of through the mobile communication system 10, a payment option is selected S803 and clicked by the user when the loan interest is intended for payment. Then, the loan/payment application 12 has access to the IC card chip 11 and displays a list of withdrawal accounts among general financial accounts (excluding loan accounts) of the user in the display window of the mobile communication system 10.

Now the user may select the corresponding withdrawal account from the withdrawal account list displayed in the display window of the mobile communication system 10 and input a password of the corresponding withdrawal account. Here, the withdrawal account may be selected either by one stored in the IC card chip 11 or by direct inputting of the user S804.

The loan/payment application 12 drafts a reserved loan interest payment transaction request message by information on the loan account and its payment, the withdrawal account and its number, a financial institution which undergoes money withdrawals, and so forth, and establishes a data transmission line with respect to the banking server 40, and then requests a reserved loan interest payment transaction through the data transmission line.

Then, the banking server 40 performs a predetermined customer authentication process in cooperation with the financial institution having the withdrawal account, constructs a reserved loan interest payment transaction response message, and transmits the reserved loan interest payment transaction response message to the mobile communication system 10.

When a reserved loan interest payment transaction history transmitted by the banking server 40 is displayed in the display window of the mobile communication system 10, and then the final "repayment confirmation" is made by the user, the loan/payment application 12 drafts a main loan interest payment transaction request message and transmits it to the banking server 40.

The banking server 40 processes a main loan interest payment transaction history with respect to the loan account and the withdrawal account, and transmits a main loan interest payment transaction response message to the mobile communication system 10.

In this manner, when the main loan interest payment transaction response message is normally received, the loan/payment application 12 releases the data transmission line between the mobile communication system 10 and the banking server 40, and outputs the processed result to the display window of the mobile communication system 10.

Meanwhile, the process of the loan inquiry/interest payment set forth with reference to FIGS. 7 and 8 is generally divided into a process of the loan account overview inquiry, a process of the loan interest inquiry, and a process of the loan interest payment, all of which may be performed separately or continuously to any other processes. In other words, the user can select the loan account and the withdrawal account immediately without separately inquiring of the loan account and the loan interest, and deal with payment of the loan interest (or principal). Further, the user can inquire of the overview of the loan and details of the loan interest, and pay the loan interest and/or principal.

As set forth above, according to the present invention, when the user makes use of the banking services by use of this mobile communication system, the procedure of inputting the account number and ID (PIN)/password through the mobile communication system each time is omitted, because a removable IC card chip and a banking application driven on the Java VM are used. Therefore, it is possible to facilitate banking of the user.

Further, according to the present invention, various kinds of mobile banking or authentication are processed before the mobile communication system has access to a banking server. Thus, it is possible to minimize the access time between the mobile communication system and the banking server, and thus, to reduce the burden on the charges for the phone call (i.e., communication charges) of the user, and to minimize network loads. At the same time, it is possible to reinforce security of data and financial information under the mobile environment by the PIN authentication of the removable IC card chip or any other security modules.

While the foregoing embodiments are simply illustrated to implement the method for providing banking services by use of a mobile communication system, it will be understood by those skilled in the art that various changes in form and details may be made therein without departing from the spirit and scope of the invention as defined by the appended claims.

What is claimed is:

1. A method of providing banking services using a mobile communication system, with which financial transactions are performed with a banking server of at least one financial institution, the mobile communication system having a removable built-in integrated circuit (IC) card chip that stores at least personal identification number (PIN) information and information related to financial accounts of a user, the method comprising:

selecting an electronic bankbook service through one of a mobile banking (M/B) dedicated key and a menu option of the mobile communication system, and selecting a financial transaction of the electronic bankbook service;

comparing PIN information input to the mobile communication system with the PIN information stored in the IC card chip to authorize access to data stored in the IC card chip;

displaying financial account information of the user stored in the IC card chip in a display window of the mobile communication system when access to data stored in the IC card chip is authorized;

forming a financial transaction request message using information relating to a selected financial account through a banking application stored in the mobile communication system, and transmitting the financial transaction request message to the banking server when a signal based on a selection of the financial account is input to the mobile communication system;

performing a predetermined customer authentication process with respect to the selected financial transaction and the selected financial account at the banking server, and transmitting a financial transaction response message from the banking server to the mobile communication system; and receiving the financial transaction response message transmitted from the banking server, and displaying a resulting transaction history in the display window of the mobile communication system.

2. The method set forth in claim 1, further comprising:

updating information on at least one of a new account which is newly opened at a bank institution and an old account which is corrected or closed with respect to the IC card chip of the mobile communication system using a wireless communication network; and modifying, by the user, the PIN information of the IC card chip, wherein the mobile communication system and the banking server use one of an E2E (end to end) encryption and a WPKI (wireless public key infrastructure) encryption for security of data and financial information.

3. The method set forth in claim 1, wherein the mobile communication system is one of a mobile phone, a smart phone and a personal digital assistant (PDA), and the financial transaction request message is formed using account numbers of financial accounts of the user, financial institution codes corresponding to the financial accounts, kinds of the financial accounts and customer information.

4. The method set forth in claim 1, further comprising checking the information relating to the selected financial account through the banking application at the IC card chip, transmitting an account inquiry request message to the banking server, and displaying a response message of a transaction history transmitted from the banking server when the financial transaction selected through the mobile communication system is a financial account inquiry transaction.

5. The method set forth in claim 3, further comprising checking the information relating to the selected financial account through the banking application at the IC card chip, transmitting an account inquiry request message to the banking server, and displaying a response message of a transaction history transmitted from the banking server when the financial transaction selected through the mobile communication system is a financial account inquiry transaction.

6. The method set forth in claim 3, further comprising:

inputting a password and a transfer amount of a withdrawal account, an account number of a deposit account, and information of a corresponding financial institution when the financial transaction selected through the mobile communication system is a transfer or remittance transaction;

requesting a reserved transfer transaction from the banking server based on information of the deposit and withdrawal accounts and the transfer amount;

generating a security card number consisting of at least one random number from the banking server in response to the reserved transfer transaction, transmitting the generated security card number to the mobile communication system, inputting the security card number into the mobile communication system, and transmitting the input security card number to the banking server; and transmitting the security card number to the banking server to request a main transfer transaction with respect to the deposit and withdrawal accounts, and receiving a result of processing the main transfer transaction from the banking server to display the processed result in the display window of the mobile communication system.

7. The method set forth in claim 6, further comprising registering a target account after the financial transaction as a favorite account.

8. The method set forth in claim 7, wherein the account number of the deposit account and the corresponding financial institution information is input directly, or by searching a favorite deposit account with the banking application.

9. The method set forth in claim 3, further comprising, when the financial transaction selected through the mobile communication system is a a loan inquiry or loan interest payment transaction:

extracting a list of loan accounts stored in the IC card chip, displaying the list of loan accounts in the display window of the mobile communication system, and checking information related to a loan account selected from the list of loan accounts;

accessing the banking server based on the information related to the selected loan account to request information on a transaction history of the selected loan account, receiving a response message to the request, and outputting the response message to the display window of the mobile communication system;

extracting and displaying a list of general financial accounts stored in the IC card chip, selecting a withdrawal account for money withdrawal from the list of general financial accounts, and inputting a password of the withdrawal account;

transmitting information relating to the selected loan and withdrawal accounts to the banking server, requesting a reserved payment transaction, receiving a response message from the banking server, and outputting the response message; and processing a main transaction following the reserved payment transaction in cooperation with the banking server in response to the request of the main transaction by the user after the reserved payment transaction is performed.

10. The method set forth in claim 9, further comprising:

requesting loan interest information of the selected loan account from the banking server according to the request of the user, receiving the response message, and outputting the response message to the display window of the mobile communication system.

11. The method set forth in claim 1, further comprising:

inputting a password and a transfer amount of a withdrawal account, an account number of a deposit account, and information of a corresponding financial institution when the financial transaction selected through the mobile communication system is a transfer or remittance transaction;

requesting a reserved transfer transaction from the banking server based on information of the deposit and withdrawal accounts and the transfer amount;

generating a security card number consisting of at least one random number from the banking server in response to the reserved transfer transaction, transmitting the generated security card number to the mobile communication system, inputting the security card number into the mobile communication system, and transmitting the input security card number to the banking server; and transmitting the security card number to the banking server to request a main transfer transaction with respect to the deposit and withdrawal accounts, and receiving a result of processing the main transfer transaction from the banking server to display the processed result in the display window of the mobile communication system.

12. The method set forth in claim 11, further comprising registering a target account after the financial transaction as a favorite account.

13. The method set forth in claim 12, wherein the account number of the deposit account and the corresponding financial institution information is input directly, or by searching a favorite deposit account with the banking application.

14. The method set forth in claim 1, further comprising, when the financial transaction selected through the mobile communication system is a a loan inquiry or loan interest payment transaction:
- extracting a list of loan accounts stored in the IC card chip, displaying the list of loan accounts in the display window of the mobile communication system, and checking information related to a loan account selected from the list of loan accounts;
- accessing the banking server based on the information related to the selected loan account to request information on a transaction history of the selected loan account, receiving a response message to the request, and outputting the response message to the display window of the mobile communication system;
- extracting and displaying a list of general financial accounts stored in the IC card chip, selecting a withdrawal account for money withdrawal from the list of general financial accounts, and inputting a password of the withdrawal account;
- transmitting information relating to the selected loan and withdrawal accounts to the banking server, requesting a reserved payment transaction, receiving a response message from the banking server, and outputting the response message; and
- processing a main transaction following the reserved payment transaction in cooperation with the banking server in response to the request of the main transaction by the user after the reserved payment transaction is performed.

15. The method set forth in claim 14, further comprising:
- requesting loan interest information of the selected loan account from the banking server according to the request of the user, receiving the response message, and outputting the response message to the display window of the mobile communication system.

16. The method set forth in claim 1, wherein the financial transactions are at least one of a financial account inquiry, a transfer and remittance, and a loan and loan interest payment.

* * * * *